(12) United States Patent
Burgess, Jr.

(10) Patent No.: US 7,331,833 B2
(45) Date of Patent: Feb. 19, 2008

(54) PERSONAL PROPULSION DEVICE WITH HANDS FREE CONTROL

(76) Inventor: Donald Wesley Burgess, Jr., 33755 Puma La., Squaw Valley, CA (US) 93675

( * ) Notice: Subject to any disclaimer, the term of this patent is extended or adjusted under 35 U.S.C. 154(b) by 0 days.

(21) Appl. No.: 11/477,238

(22) Filed: Jun. 28, 2006

(65) Prior Publication Data

US 2007/0010143 A1    Jan. 11, 2007

Related U.S. Application Data

(60) Provisional application No. 60/695,789, filed on Jun. 28, 2005.

(51) Int. Cl.
*B63H 7/00* (2006.01)
(52) U.S. Cl. ............................ 440/37; 180/180
(58) Field of Classification Search ................ 114/315; 180/180, 181, 182; 244/12.2; 440/1, 6, 440/37
See application file for complete search history.

(56) References Cited

U.S. PATENT DOCUMENTS

| | | | |
|---|---|---|---|
| 2,456,440 A | 12/1948 | Morrill | |
| 3,323,481 A * | 6/1967 | Harvey | 114/315 |
| 4,189,019 A | 2/1980 | Zech | |
| 5,222,569 A | 6/1993 | Martel | |
| 5,381,870 A * | 1/1995 | Kaufman | 180/181 |
| 5,509,372 A * | 4/1996 | Culotta | 114/315 |
| 5,620,153 A | 4/1997 | Ginsberg | |
| 6,776,133 B2 | 8/2004 | Tezuka et al. | |
| 7,179,141 B1 * | 2/2007 | McMullen | 440/37 |

* cited by examiner

Primary Examiner—Lars A. Olson
(74) Attorney, Agent, or Firm—Richard A. Ryan

(57) ABSTRACT

An improved personal propulsion device that generally imparts thrust directly to the user. The device allows hands free control of thrust magnitude and direction so both hands can grasp and control bicycle handlebars and brakes, watercraft paddles, ski poles, etc. The device is adjustable vertically, on the users' back, higher to allow sitting in a canoe or wheelchair and lower for standing on skates, skis, kick scooters etc. A user on a bicycle may prefer to lean forward for comfort and aerodynamics, a device adjustment compensates and delivers level thrust. A user on a snowboard or skateboard stands oblique to the direction of travel, a device adjustment allows in line thrust. Both users' hands and arms are free to balance, protect others by pushing off or break a fall.

20 Claims, 11 Drawing Sheets

PERSONAL PROPULSION DEVICE WITH HANDS FREE CONTROL

CROSS-REFERENCE TO RELATED APPLICATIONS

This application claims the benefit of Provisional Patent Application Ser. No. 60/695,789 filed Jun. 28, 2005 by the present inventor.

BACKGROUND OF THE INVENTION

A. Field of the Invention

This invention generally relates to a personal propulsion device generally mounted directly on the user, specifically the hands free operation and control(s) of the device and adjustments for versatility.

B. Prior Art

The propelling device of Morrill, U.S. Pat. No. 2,456,440, discloses a thrust device supported by one arm only. The user is imbalanced by the offset weight. The center of thrust is in line with the one supporting arm of the user and therefore misaligned or offset from the center of resistance of the users' skates, as shown in FIG. 3. Torque about the user's vertical axis makes straight line travel and maneuverability difficult. The support of the device by one arm will rapidly become fatiguing to that arm and long duration travel will be uncomfortable or intolerable. The support bar along the side of the user, the gas tank and the throttle appendage in front of the user become a hazard in the event of a fall. The engine is located behind the propeller, thereby increasing the distance from the support and, therefore, increasing the cantilevered weight to the user's arm. Riding a modern bicycle with only one hand is dangerous as two brake handles are provided for safety in traffic. Sitting in and operating a wheelchair requires both hands for steering. The engine would interfere with sitting in the wheelchair. In a canoe or kayak, the engine would interfere with both hands and arms being required for the paddles. An engine speed of 18,000 to 20,000 rpm is dangerous as propellers can and do shatter, which may cause serious injuries to the user and bystanders. Six pounds of thrust is low and insufficient for overcoming inclines and soft snow with heavier users, and slow in watercraft against even a light wind.

Zechs' propulsion support unit, U.S. Pat. No. 4,189,019, discloses a complex system of levers, springs, turntable and bars on both sides of the users' body. Both hands and arms are required for controls. The unit described with a 25-30 lb. motor, plus frame and support unit, would weigh approximately 40 lbs with the propeller and protection shroud. The frame top terminates in rigid tube ends which during a fall may on contact with the back or sides of the head and neck cause injury to the user. The control bars at the sides of the user present a further injury hazard in the event of a fall. The unit would be impossible to operate on a bicycle, and the position on the user's body would interfere with a canoe, kayak and wheelchair. On snow skis the requirement of both hands and both arms renders the user unable to grip and maneuver the pair of ski poles essential for balance, turning and accelerating over rough terrain. The many parts, heavy weight, high cost of manufacturing, hazardous in a fall, and both hands and arms occupied, make this invention less attractive as an alternative form of transportation.

Zech further discloses a propeller shroud, as shown in FIG. 7. A sufficient body of research has proven the thrust is reduced substantially by shrouding, compared with an open propeller, without including an "inlet lip" of 15% diameter of the shroud (see Modern Propeller and Duct Design by Martin Hollman, 1993, pg 101—incorporated herein by reference). The current invention includes a bumper/flotation device that cooperates with airflow at the inlet end of the containment ring.

Martels' propulsion means, U.S. Pat. No. 5,222,569, discloses a device that imparts thrust "solely to the rear of the pelvic area." The propulsion device is supported by a pendulum shoulder harness on the user and must be controlled by both hands on a pair of grips and pivoting handles along both sides of the user. These side handles are an injury hazard in a fall. The device is hanging free on the pendulum harness except for the users hands on the two handle grips, so in the event of a fall when the users hands release the handles to break the fall, the unit can swing around the neck or impact the users head and neck causing injury. The foot starting cable may become entangled around the user causing further injury. The device is located below the axis centered on the pelvic region and the user may not sit in a canoe, kayak, wheelchair or bicycle. Further more the users hands would be unavailable to grasp the required maneuvering implements such as paddles, brakes, handle bars, wheels of the wheelchair etc. If the user released the handles to grasp implements the unit would swing out of control causing an impact hazard. The propulsion device does nothing to improve open propeller inefficiencies (see Modern Propeller and Duct Design by Hollman, 1993, pg. 95 and 97—incorporated herein by reference).

The current invention will overcome the above referenced hand and arm requirements. It will allow hands free operation and control of a simple light weight, efficient, economical, device that is adjustable up and down the user's back. The current invention eliminates the need for any side bar for control. This will allow co-operative use with any of the well known transportation or recreational human powered vehicles (HPVs) such as bicycles, kick scooters, wheelchairs, canoes, kayaks, small sail craft, skateboards, all ice and roller skates, and snow skis etc.

In addition, the current invention anticipates use proximate to crowds of people and has many safety and convenience improvements.

Ginsberg's light aircraft with inflatable parachute wing propelled by a ducted propeller, U.S. Pat. No. 5,620,153, teaches that the efficiency of an aircraft propeller is reduced at low speeds and can be improved by the addition of a duct, comprising support vanes to counter act the torque of the engine, and a propeller or fan centered and mounted rotationally within. The addition of the duct improves safety, reduces noise and improves thrust to power ration. Further study teaches that a ducted fan or shrouded propeller comprises an inlet lip attached and tangent to the duct with a special fan, turbine, or propeller of greater surface area than standard open aircraft propellers of the same diameter. It is known in the art that a very close tolerance between the propeller and the interior surface of the duct, 0.015 inch maximum up to an 18 inch diameter propeller is required. This close tolerance requires stiffened duct and vane arrangement and the cost of the composites and manufacturing of them, to stiffen the unit and retain the light weight features required in aircraft is prohibitive for a personal propulsion device. The rpm is also increased in a ducted fan and results in an unacceptable blade failure risk proximate to crowd and children on bicycle paths, sidewalks, and boardwalks for ground transportation.

The current invention overcomes the dangers of the ducted fan and the prohibitive cost of the rigidity required and the lack of availability of ducted fan parts in the required sizes. The inlet lip is of a complex increasing radius design which also increases design and manufacturing costs (see Modern Propeller and Duct Design by Hollman, 1993, pg 101 and 102—incorporated herein by reference).

The current invention improves the efficiency of the open propeller and improves the personal propulsion device safety using commonly available materials of very low cost and weight. The manufacturing processes required are simple and inexpensive. The propellers required are commonly available for large model aircraft in wood, plastic, fiber reinforced nylon, and other materials. The diameters and pitches are diverse and can be adapted for use in the current invention for any rpm, size user, or horsepower required in a two, three or multiple blade configuration.

The recoil rope type manual starters that are standard in the industry have been improved to be operable from the user position. Tezuka et. al, U.S. Pat. No. 6,776,133, discloses a starter extension that is pulled along side the operator in the standard working position. None of the prior art machines adjust slidably up high on the users back and down low on the users back. This wide variation in propulsion device positions on the user, would dispose the starter handle in the region of the arm pit at its high adjustment. This position removes the strength and leverage advantage of the operators arm, against the load, due to the inconvenient position. The various positions on the users back facilitated by the current invention, would place the fixed end of the flexible tube and its fixing bracket, as shown in FIG. 3, in the path of the swinging arm or elbow of a canoe paddler or snow skier. The rigorous anticipated and intended uses of this current invention require free motion and unobstructed use of arms and elbows through their full range of motion, without chance of impact or contact with any part of the propulsion device. My current invention will over come the limitations and injury hazards of the prior art recoil starters.

The prior art of personal propulsion means attached directly to the user has resulted in heavy, slow, inefficient devices. One or both hand(s) and arm(s) are continuously required for control of the devices. There are handles and appendages that create a safety/injury hazard to the user in the event of a fall. The devices lack sufficient adjustments in position on user, and thrust angle to provide wide versatility in cooperation with the many HPVs available today. There are no personal propulsion devices widely available on the market currently, so the public has benefited little from prior art devices.

As freeway, street, and parking lot crowding increase, the demand and cost of fossil fuels are at a record high world wide. Pollution from auto emissions is an increasing concern of the public and the global warming awareness is on the increase. The dependency of the United States on foreign oil and the consumption of world wide petroleum reserves will create new record high prices. Emerging countries' fuel demand in conjunction with the aforementioned pressures, point to ever increasing prices and ever tightening supplies.

A need exists for a compact, extremely low fuel consumption, user friendly, hands free operation, light weight, low emissions, unlimited range (with occasional refueling at any gas station) alternative transportation device. This need for alternative transportation is recognized widely as bicycle paths and designated bicycle lanes on streets and roads are being built at great cost and prompted aggressively. This is occurring in large cities and small towns alike, as the negative impact of too many automobiles is pervasive. The popularity of HPVs is at an all time high. The range of HPVs has always been limited by the endurance of the user and thereby eliminating much of the public from benefiting from such devices.

The massive competition in the lawn and garden equipment market has resulted in rapid and major improvements to the motors. The resulting improvements directly benefit the present invention. The major improvements are reliability, manufacturer's product up to 2000 hrs of trouble free use. Emissions reductions; the public and community awareness of small engine pollution (especially two-strokes where oil is pre-mixed with gas) and in co-operation with state air resources agencies, have ever tightened standards of compliance among small engine manufacturers. User friendly features are now major selling points such as lighter weight and high power. Currently a 2.2 hp totally self contained motor weighs only nine pounds. Other features include a fuel primer bulb for first pull and easy starting, all position running, quieter mufflers, regular gas required with greater fuel economy and less vibration to the user.

The current invention benefits from the motor configuration of the increasingly popular string trimmer. There are many manufacturers to select from. There are many power options and option packages to select from. A size and weight range of the present invention can be offered to the public to accommodate various sizes of users. The operator of the string trimmer benefits from the vibration isolation bushing between the engine and drive shaft housing and the current invention will benefit also.

For the rest of this document the term string trimmer motor is implied to comprise the standard, widely available string trimmer motor which is totally self contained. It includes a centrifugal clutch so at an idle condition the load is at rest. It includes a leak proof all position fuel tank. It includes a recoil rope starter. It includes a vibration isolation bushing between the motor and the drive shaft housing tube. It includes a muffler and or catalytic converter and or spark arrester as local regulations require. It includes a carburetor having a fuel primer squeeze bulb, a convenient choke, a throttle, and an air filter. It may be of either the two stroke, more noisy and requiring premixed oil in the gas, but is lighter, or the four stroke, quieter, less exhaust emissions, uses regular gas but is heavier per horse power. These motors have smooth exterior cowlings and are air cooled.

C. Objects and Advantages

Accordingly, several objects and advantages of my invention are; the user enjoys hands free control of the thrust magnitude imparted generally to the users back from no thrust to full thrust and any magnitude between these limits.

The user enjoys the freedom of arm(s) and hand(s) free movement while operating the personal propulsion device without control bar(s) or protrusions extruding from the frame along the users sides, improving safety in the event of a fall.

My invention can be adjusted high on the users back so the user can sit comfortably in a canoe, kayak, wheelchair or other HPVs and use both hands to freely paddle or maneuver, or break each with hands and arms unencumbered.

My invention is light weight balanced and comfortable and can be used for hours without fatigue or discomfort.

My invention includes an impact absorbing bumper around the circumference of the propeller to cushion the shock of impact imparted to the user and device in case of a fall. The bumper is light weight and acts as a floatation feature to give the device positive buoyancy incase user falls into the water during water craft use.

My invention is adjustable to the middle of the user back to allow comfortable bicycle riding with both hands free to shift gears, operate both brakes and maintain both hands on the handle bars. An adjustment allows the user to lean forward into the racing position for comfort and improved aerodynamics and the device delivers horizontal thrust.

My invention is adjustable rotatably about the vertical axis of the user to allow user to stand oblique to the direction of travel as on a skateboard or snowboard and deliver thrust inline with the direction of travel. The users' hands and arms are free for balance and safety to grab objects or break a fall.

My invention pushes the user at 25 miles per hour or greater on a standard road bicycle while achieving 150 miles to the gallon of regular gasoline without pedaling. The device performance and efficiency will improve with continuing research and development.

My invention allows the user to start the device from the users' position so user stops the motor without remorse. This saves fuel at long traffic lights and promotes good will while coasting by crowds silently on boardwalks or street fairs etc. and when the noise even at idle would be offensive.

My invention allows the user of a wheelchair increased range and freedom with the assistance of thrust while hands free control facilitates both hands on the wheels for steering and braking.

My invention allows the user to purchase and operate the unit for transportation at an overall cost far less than other transportation means and yet enjoy unlimited range of travel. The user benefits from economical and effortless locomotion.

Further objects and advantages of my invention will become apparent from a consideration of the drawings and ensuing description.

SUMMARY OF THE INVENTION

The current invention generally is worn on the users back to impart thrust to the user to assist traveling on any bicycle, skates, skies, canoe, kayak, or wheelchair or other HPVs. The device is adjustable slidable higher and lower on the users back to accommodate the aforementioned vehicles/apparatuses. The personal propulsion device allows hand free control of thrust magnitude so the user can grasp and operate any maneuverability or safety controls of above mentioned apparatuses, continuously, while simultaneously controlling said propulsion device. Adjustments of the thrust direction of the propulsion device allow the user to stand oblique to the direction of travel as on a snowboard or skateboard and deliver thrust inline with the direction of travel. The user can lean forward on a bicycle on a racing position to improve aerodynamics and comfort and the device can be adjusted to deliver horizontal thrust. Thus the reader can see that the user can travel economically and effortlessly on any HPVs or apparatus' for reducing locomotive effort.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

Figure 1:
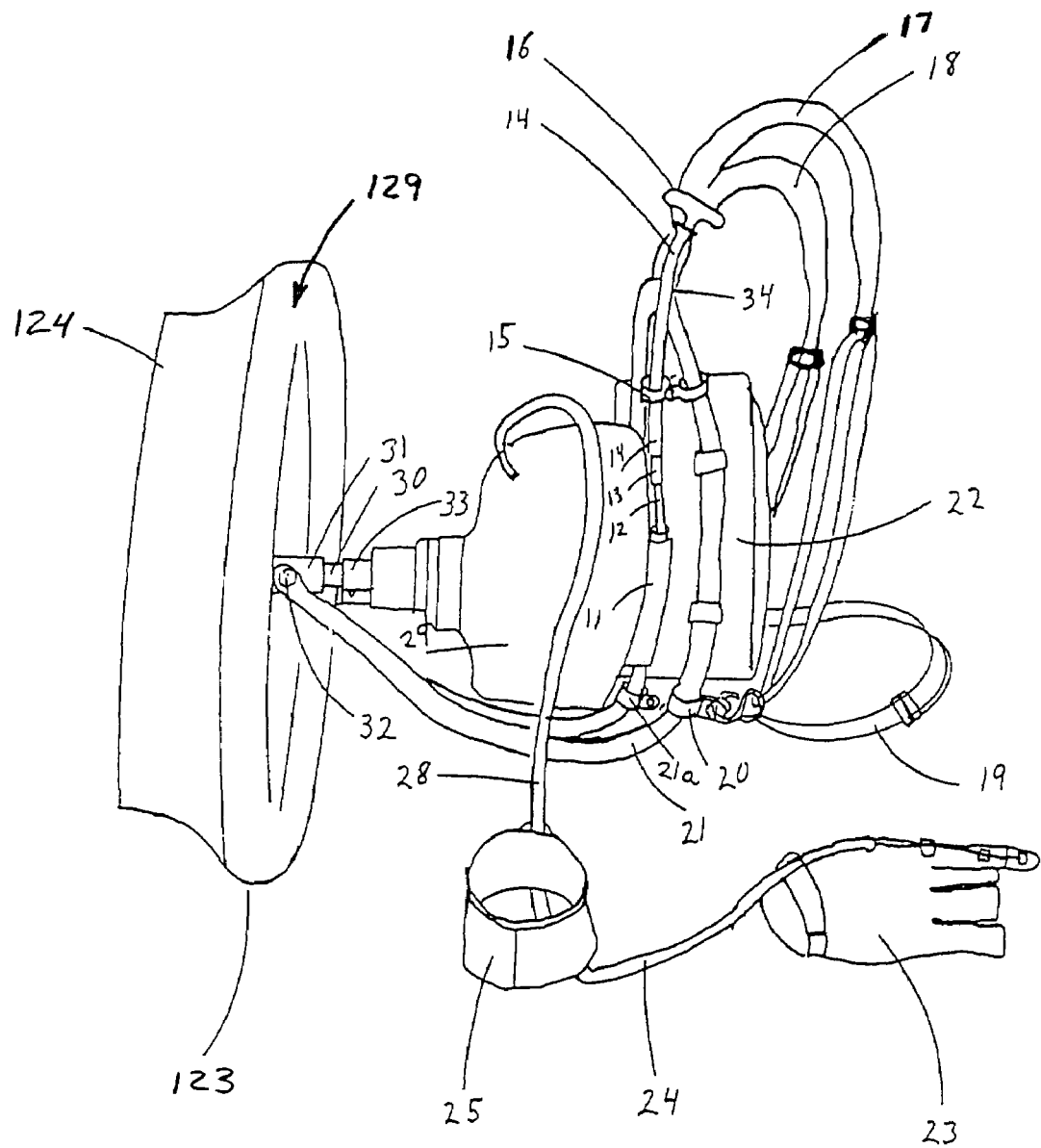
FIG. 1 is a side view of a Personal Propulsion Device configured according to a preferred embodiment of the present invention.
Figure 3:
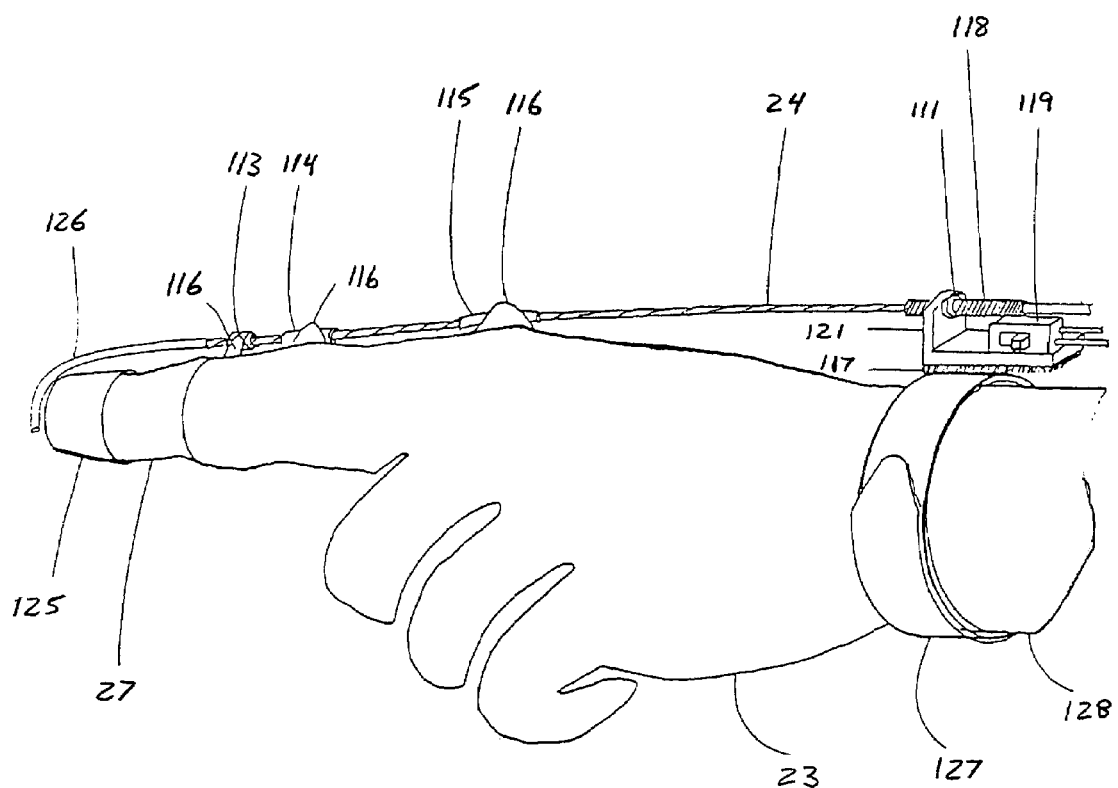
FIG. 3 is an isolated a side view of the throttle control glove shown on the hand of a user.

As shown in FIG. 1, in the preferred embodiment of the personal propulsion device 11 of the present invention the motor 29 contains a vibration isolated motor mount clamp 33 and is secured to the propeller shaft housing tube 30. The pivot block 31 slides onto the propeller drive shaft housing tube 30 and is clamped securely by tightening pivot block bolt 32. The pivot block 31 is attached to a light weight aluminum frame 21 with the pivot block bolt 32. As the pivot block bolt 32 is tightened it secures other parts, shown in detail in FIG. 11, simultaneously. A comfort pad 22 is secured to frame 21 and padded adjustable shoulder straps 17 and 18 are attached to the top of the frame 21 and secured to bottom of frame 21 with clamps 20 and 20a. The adjustable waist belt 19 is also attached to clamps 20 and 20a. The throttle control glove 23, which is shown in detail in FIG. 3, is connected to the motor 29 using a standard throttle cable 24 and ignition switch in general use today as small engine controls.

The flexible over the shoulder recoil starter extension 34 is comprised of a flexible spring like housing 14 with a friction reducing plastic tube liner 13. The recoil starter rope 12 is extended or replaced with a new rope 12 of sufficient length to accommodate the extension 34. The rope 12 passes through tube 13 and is attached to pull handle 16. The extension assembly 34 is secured to the frame 21 with clamp system 15. This flexible and extended started improvement allows the starter 34 to conform to the padded shoulder strap 18 when the starter extension 34 is attached to the strap 18. This allows easy access to the starter handle 21 when the device 11 is adjusted high on the user's back or low on user's back, as shown in FIG. 2.

At the bottom or motor end of the starter extension assembly 34, open rope 12 remains open and the housing flexible to allow the motor 29 to be pivoted at the pivot block 31 and still be pull started while misaligned relative to the frame 21. Both ends are free and flexible to allow adjustments at both ends of the starter extension assembly 34.

The flexible over the shoulder recoil starter extension 34 is an improvement that other power equipment in use today will benefit from. For example, the backpack leaf blowers of the gasoline motor type have to be removed from the user to be started but with this improvement can be started from the user position. This feature improves convenience and allows stopping the motor without hesitation or remorse which conserves fuel and reduces unnecessary emission and pollution.

Figure 2:
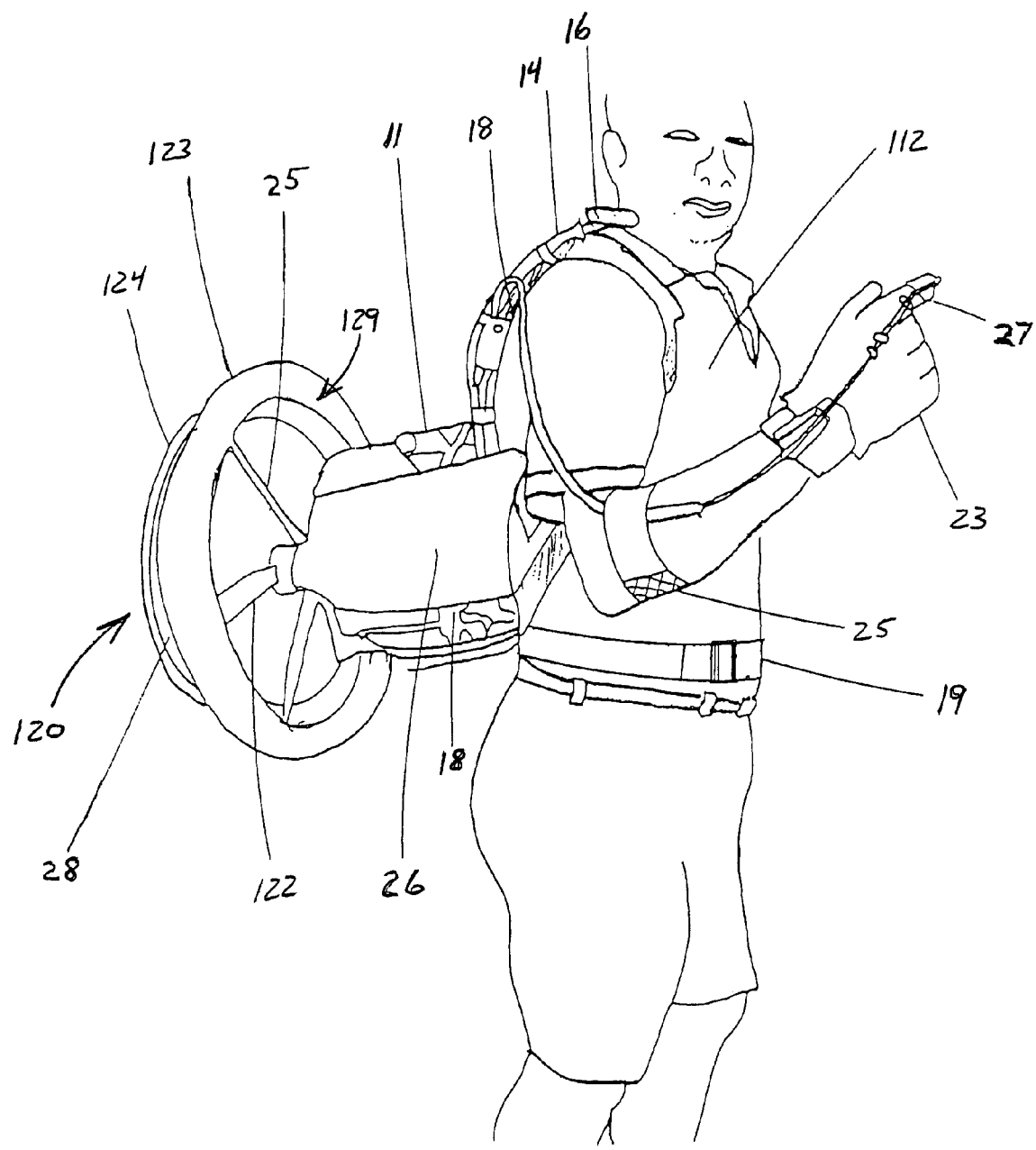
FIG. 2 is a side view of a Personal Propulsion Device of FIG. 1 shown on a user.

In FIG. 2, the Personal Propulsion device 11 is in the middle to lower back position and viewed from the right side of user 112 to show the throttle control glove 23 on a right handed user. The throttle cable and run/stop switch wires are bundled together and attached to the user at the throttle control glove 23, the elbow adjustable cable strap 25 and at the right shoulder strap 18 before it enters the motor 29. A metal screen, not shown, is attached to the rear of the propellers shroud inlet lip 123 securely. These safety screens, not shown, if removed, will open a micro switch in series with the run/stop switch and immediately disables the motor 29 so it can't be started with the safety screens removed.

The shoulder straps 17 and 18 are similar to the backpacks and leaf blower available currently but with greater length of adjustment to allow the user to shorten them by buckle adjustment to raise the personal propulsion device 11 high on the back for canoe, wheelchair use or etc. The waist belt 19 is designed to attain the alignment of the unit 11 with the direction of travel and can be adjusted to fit securely to various sized users. The waist belt 19 also secures the personal propulsion device 11 in position relative to the user's body in case of accidental fall.

The over the shoulder recoil starter extension 34 and recoil starter pull handle 16 are positioned for ease of starting with either hand. When operating the personal propulsion device 11 in near proximity to other people, stopping the motor and coasting silently by and easily restarting on the go is desirable.

The user 112 stands or sits in or on any wheeled mode of transport or in the water in any water craft or on ice skates, snow skies or other HPVs. The user starts the personal propulsion device 11 by pulling the starter handle 16, then flexes or curls the index finger of the throttle/control glove 23 to increase propeller speed and forward thrust until desired speed is achieved. The index finger 27 can then be relaxed slightly to reduce thrust to maintain desired speed and cruise for fuel efficiency.

The right fender 26, shown in FIG. 2, is attached to the frame 21 with simple clamps to help smooth the airflow around the user and draw air into the propeller 122 more smoothly. The corresponding left fender is not shown, but acts and is attached in the same manner as the right fender 26 to smooth air flow and improve the look of the unit 11 as well as provide space to advertise, affix logos, and attach night lights or reflectors for improved visibility and to display manufacturer contact information. The fenders 26 also smooth the sides of the device 11 where the user's arms and elbows are most likely to contact the device 11 during vigorous paddling etc.

The shroud 124 around the propeller 122, the inlet lip 123, and shroud support struts 25 comprise the shrouded propeller assembly 120. The assembly 120 is lightweight, strong, and aerodynamically efficient in horsepower to thrust ratio, and relatively economical to build.

The high cost of ducted fans, turbines and the high rpm required, creates hazards in fan or turbine failure and resultant explosion of parts. This makes operating these devices in close proximity to user's body and around others undesirable. An aluminum containment ring 28 is attached around the plastic shroud 124 in line with the propeller 122 tip line of travel reinforcing the shroud 124 against penetration of propeller parts in the event of propeller failure. Common rivets or screws with aircraft type locknuts should be used here to avoid parts loosening and contacting the propeller 122 in motion and becoming projectiles.

As best shown in FIG. 3, the user 112 slides on the throttle control glove 23 until the adjustable wrist anchor strap 127 is around the small of the user's wrist 128. The user 112 adjusts the wrist anchor strap 127 firmly to limit motion of throttle cable housing anchor plate 121. Placing the finger end cap 125 onto the end of the index finger 27 of the user 112 enables the curling or bending of the index finger 27 to tension and draw the throttle cable 24 through the knuckle guide bushings 113, 114 and 115 to advance a typical throttle plate of any typical motor carburetor. This finger flexing controls the motor, speed, torque, and propeller thrust imparted to the user. Flexing more advances the throttle farther and increases the thrust. With throttle control glove 23 on the user's hand the run/stop switch 119 is switched to the on or run position. The motor 29 can be started in the backpack position or on the floor or table top to first warm it up, usually requiring activation of a carburetor choke briefly and only during the initial start of the use as a warm motor require no choke for starting. During the rest of the warm motor use the motor 29 can be started, stopped, and restarted from the backpack user position with the over the shoulder recoil starter extension 34. The throttle cable guide bushings 113, 114, and 115 are made of low co-efficient of friction material, such as a plastic tubing which allows some flexing across the users knuckles as the index finger 27 is flexed.

The throttle cable guide bushings 113, 114, and 115 may be attached to the throttle control glove 23 by an epoxy adhesive 116. The throttle cable 24 tension can be adjusted by changing the position of the throttle cable housing anchor plate 121 on the wrist anchor strap 127 with a hook and loop material attached to each of said parts to accomplish a course adjustment. To accomplish a finer throttle cable 24 tension adjustment the throttle cable housing stop tube 118 is turned through threads in the throttle cable anchor plate 121 after loosening lock nut 111 and retightening the lock nut after adjustment is satisfactory. The course adjustment described above also helps accommodate the various sized hands of users and the throttle control glove 23 will be offered in various sizes. The glove 23 is detachable at the motor wire plugs, not shown, and the cable 24 is easily detached at the throttle plate 121. This detachability allows interchangeability for color coordination or to allow users of different sizes to use the same propulsion unit. Many gloves 23 may be retained for the winter, summer, reflective, night riding etc.

The throttle cable 24 is crimped to a malleable tube 126 such as brass and swedged onto the throttle cable 24 and conformed to finger end cap 125 and maybe attached to finger end cap 125 with adhesives or brazing the tube 126 to a metal finger end cap 125 made of metal such as a sewing thimble. The finger end cap 125 may have inserts of various sizes to accommodate various users. The throttle control glove 23 may be improved to include the carburetor choke control and other functions. The throttle control glove 23 may be right or left handed and may utilized only one finger to hot weather use. The throttle control glove 23 may be of breathable material for user comfort and a stretchable material to accommodate different sized user hands.

The throttle control glove 23 may employ only an electronic wireless signal transmitter with receiver servos on the motor 29 to control as many functions as desired. These wireless remote controls have been in use for many years in hobby model cars and aircraft and are currently small, lightweight, reliable and inexpensive. The throttle control glove 23 may be detachable, to allow interchanging for different users and different seasons. The glove 23 can be detached and taken with the user 112 to disable the personal propulsion device 11 to discourage theft, similar to an ignition key for an auto. As these controls continue to improve, the personal propulsion device 11 may be controlled with eye lid motion, mouth motion or other controlled inputs. With preferred embodiment of my invention the user can enjoy the use of any vehicle with full grasp of both hands and thereby be safe while operation any transport device.

Figure 4:
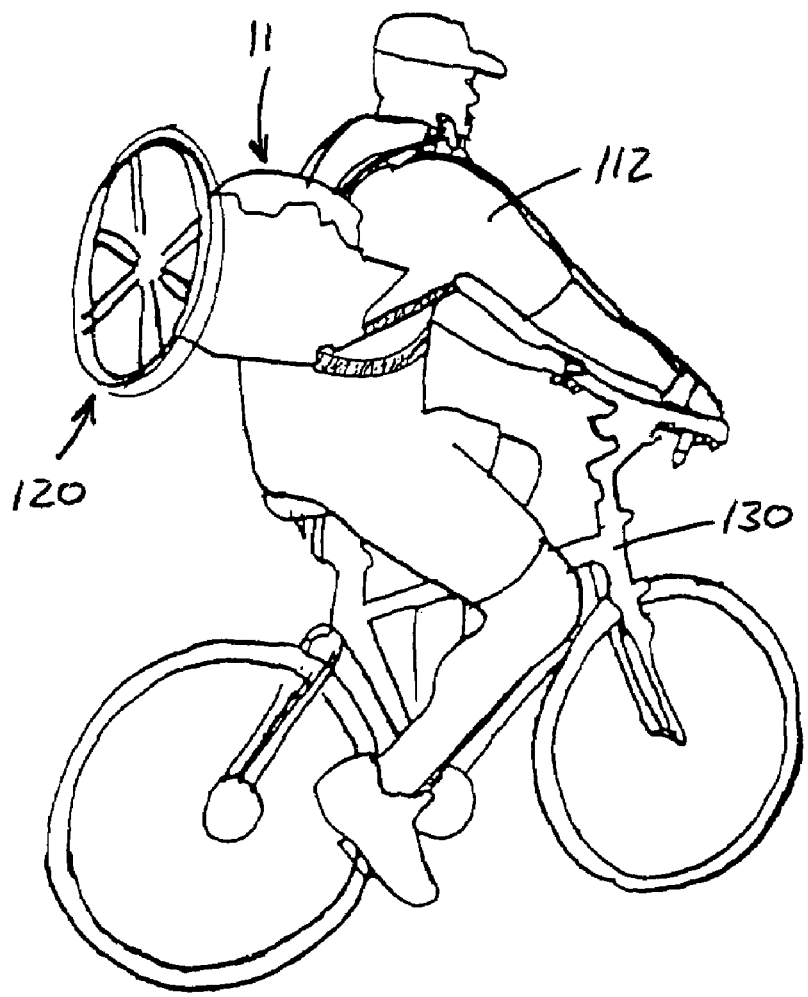
FIG. 4 is a side view of the Personal Propulsion Device shown on a user riding a bicycle in an upright position.

In FIG. 4, the user 112 is shown on bicycle 30 in the common upright sitting position for bicycle riding and has adjusted the personal propulsion device 11 to the middle of the back position. The user 112 may, at times, dismount from the seat to the standing position, straddling the top bar of the bicycle with feet positioned on the ground. In the standing position the propulsion device 11 will still be clear of the seat and rear tire.

Figure 5:
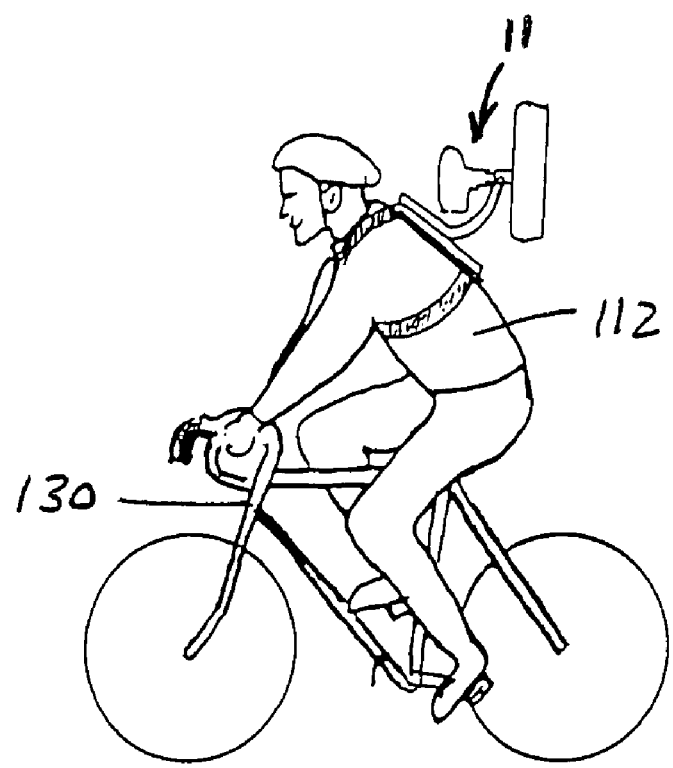
FIG. 5 is a side view of the Personal Propulsion Device shown on a user riding a bicycle in a crouch or racing position.

In FIG. 5, the user 112 is on bicycle 130 and the pivot block 31 is adjusted to nearly 45 degrees from the original position to apply direct thrust in the direction of travel details. The user 112 benefits from the crouched position by reducing his frontal area and therefore wind resistance. The personal propulsion device 11 benefits from less air disturbance entering the propeller 122. The thrust remains horizontal.

Figure 6:
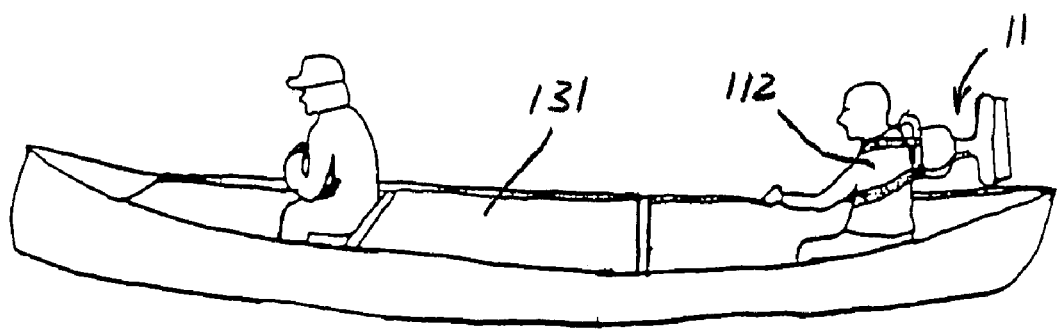
FIG. 6 is a side view of the Personal Propulsion Device shown on a user in a canoe.

In FIG. 6, the user 112 is shown in a canoe 131 and must first adjust the propulsion device 11 to the high back position as the surrounding gun whales are at his waist level and would interfere if the device 11 were fitted any lower. The bumper 129 acts as a flotation device, in the event the user enters the water displacing sufficient water to be over all buoyant.

Figure 7:
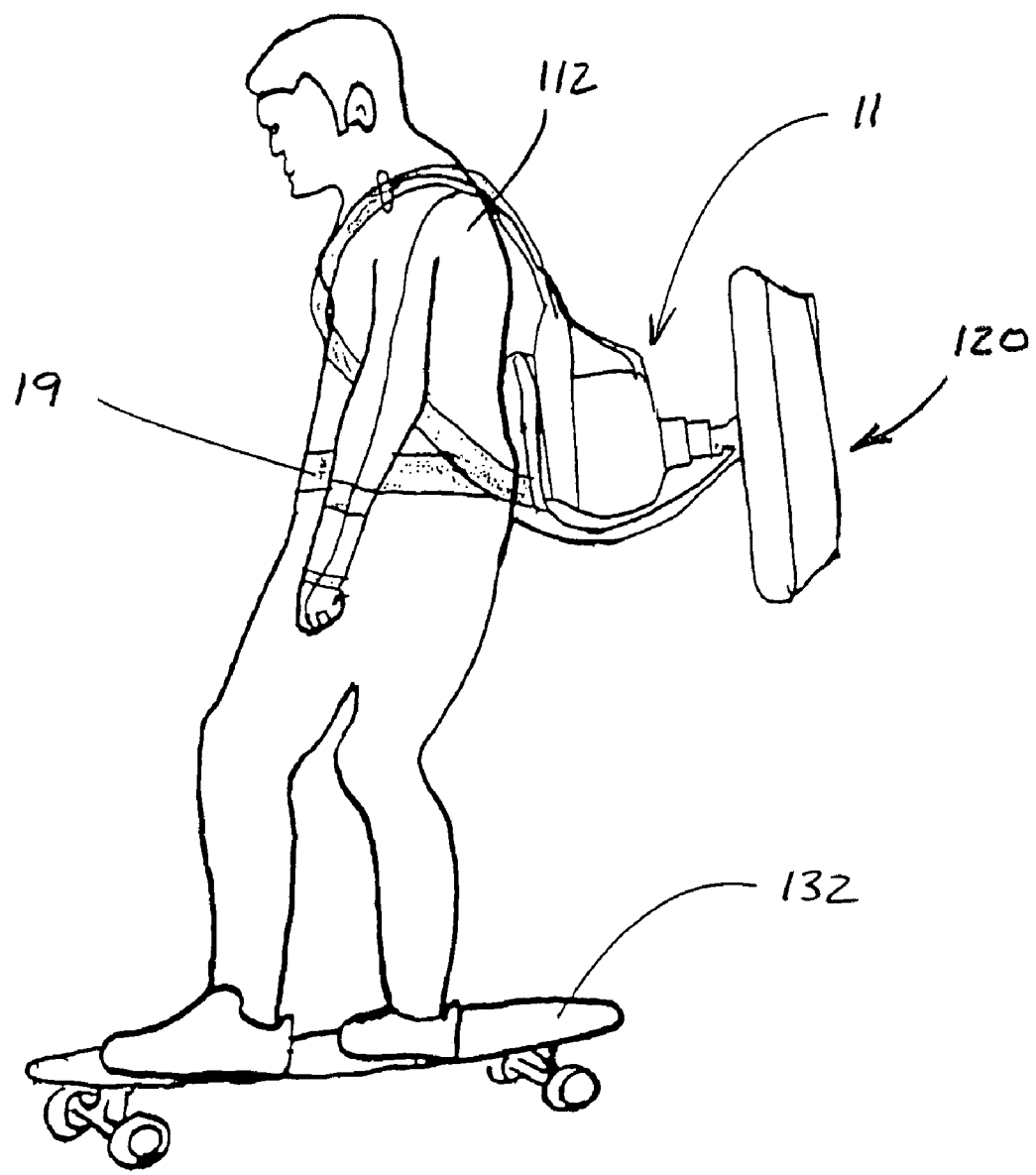
FIG. 7 is a side view of the Personal Propulsion Device shown on a user riding a skateboard.

The user 112 benefits from the low back position on a skateboard 132, shown in FIG. 7, as the center of thrust is closer to the wheel resistance of the skateboard 132. The propulsion device 11 is rotated to an oblique angle to the user 112 but thrust is retained inline with the direction of travel by the waist belt 19. The user 112 benefits from the throttle control glove 23 in that his hands are both free to use in any position to enhance balance and therefore safety. In the event of a fall, the user 112 can use both hands to break the fall instantly and without having first to release a grip on any sort of control bar.

Figure 8:
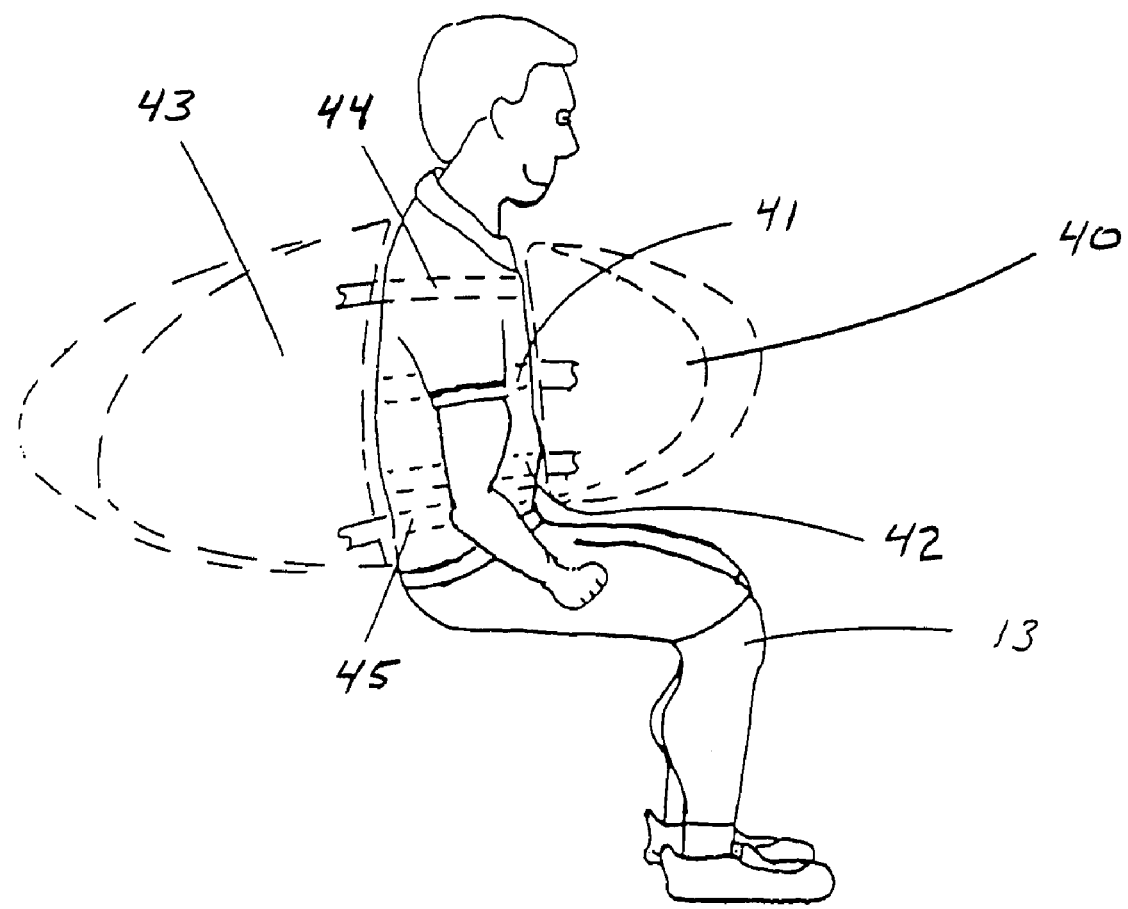
FIG. 8 is a side view of a user with an airfoil shaping safety bag.

FIG. 8 shows the side view of user 112 with the front inflatable airbag 40 that protects the user 112 from frontal impact and reduces wind resistance. The personal propulsion device 11 benefits from the aero shaping of the front airbag 40 as the air flow is separated around the user 112 more smoothly and returns to the propulsion device 11 with less disturbance than without the aero shaping airbag 40. The user 112 attaches the adjustable airbag retention straps 41 and 42 around his torso and tightens them firmly. The front airbag 40 may be used in co-operation with the rear air bag 43 by attaching the retention straps 44 and 45 as with the front airbag 40.

Using the front and rear airbags 40 and 43 simultaneously reduces the wind resistance so significantly and with very little weight increase that bicyclists, downhill skiers, hang gliders, etc. will establish economy endurance and speed records with the improved aerodynamics created with the airbags 40/43. The airbags 40/43 may be attached outside of the user's clothing or may utilize specially designed garments to help retain airbags 40/43 in position and further smooth airbag to users' body transition areas for smoother airflow. In any mode, the airbags should be of attractive high visibility colors for safety of user 112 and others. Many shapes of the airbags 40/43 will be created for various speeds and uses. In the present embodiment a stretchable material is reinforced to allow variable geometry aero shapes. As the airbags 40 and 43 are inflated with greater pressures they elongate, as shown in FIG. 8, for even less wind resistance. By complete deflating the airbags they can be stored away in a small space.

Figure 9:
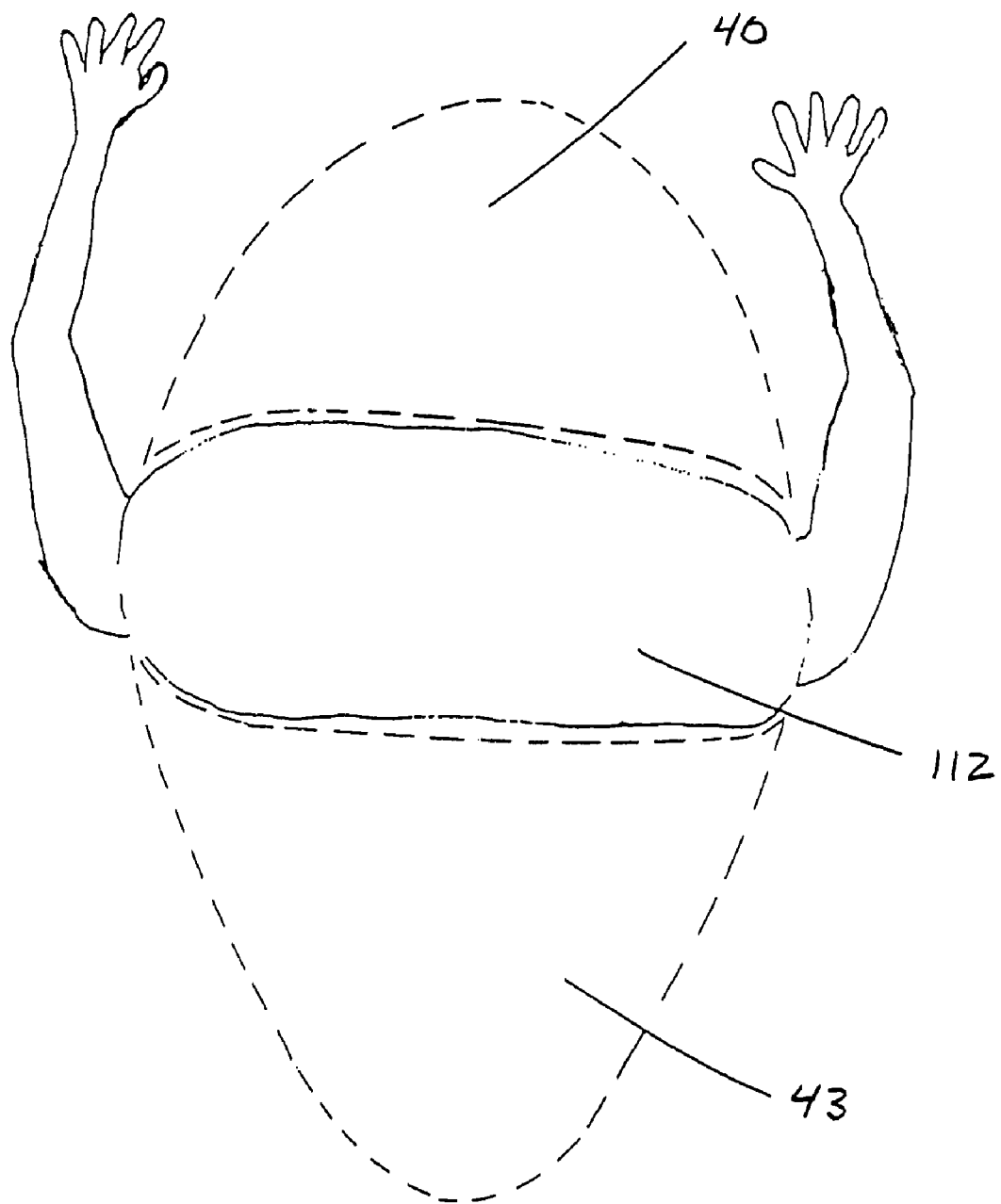
FIG. 9 is a top view of a human torso with an airfoil shaping safety bag.

FIG. 9 is a top view of a user 112 showing inflatable aero shaping front airbag 40 and co-operating rear airbag 43. When front airbag 40 is used without a personal propulsion device 11 the greatly improved aerodynamic shape is completed with the rear airbag 43.

Figure 10:
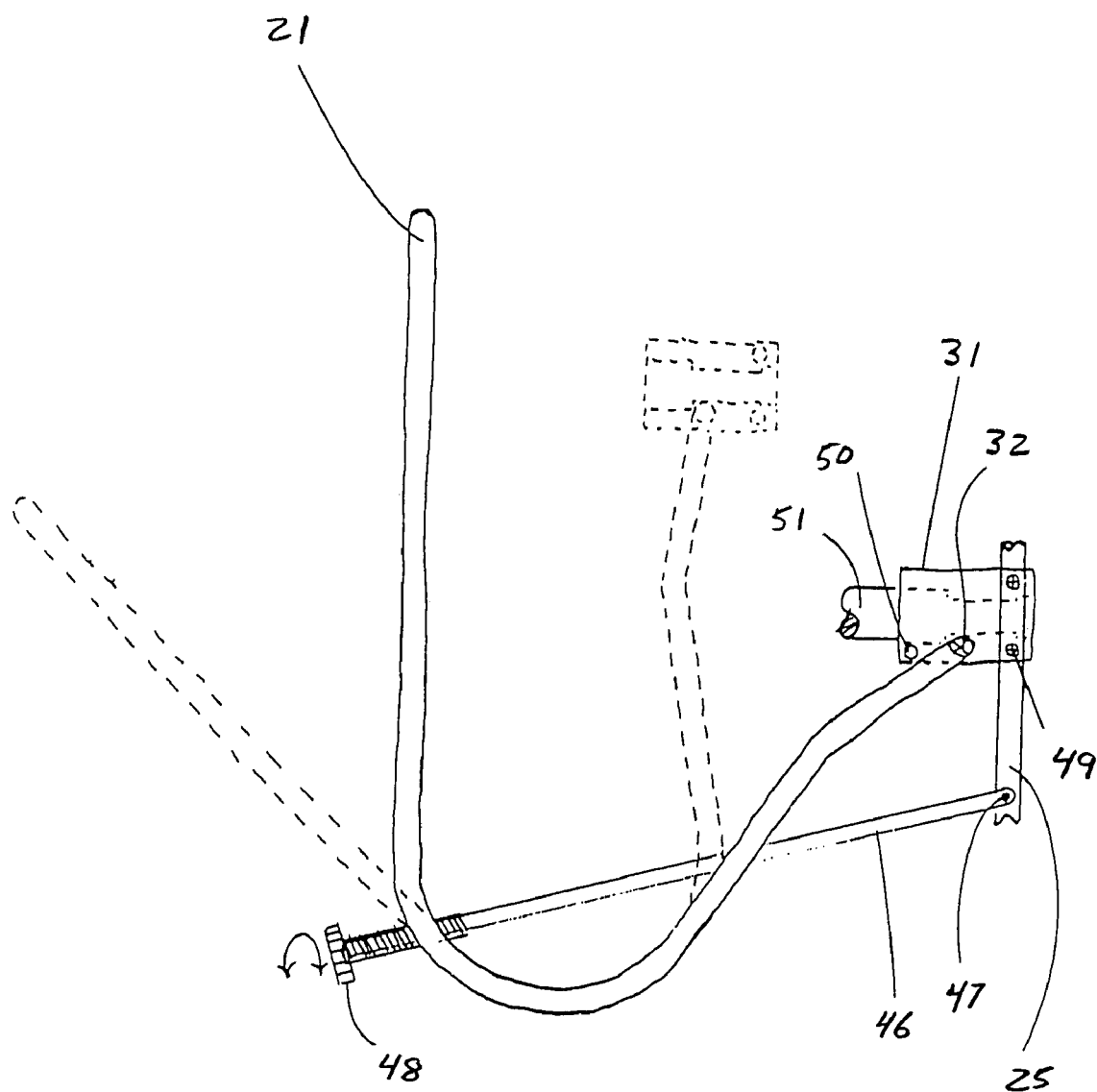
FIG. 10 is a side view of the frame of the Personal Propulsion Device of FIG. 1.

FIG. 10 is a side view of the lightweight aluminum frame 21 attached to the pivot block 31 with pivot bolt 32. The frame 21 can be rotated forward to accommodate the user 112 lowering the profile of his or her body by crouching, and the pivot block 31 can be pivoted by loosening pivot bolt 32 and retightening the bolt in pre-set position to produce horizontal thrust in a new frame position, shown as dashed lines in FIG. 10. In another embodiment, a link rod 46 is threaded at the forward end and is attached to shroud support strut 25 and allowed to pivot by link rod bolt 47. The link rod 46 is threaded through a female thread affixed to frame 21 and when the hand wheel 48 is rotated the pivot block 31 is pivoted while the personal propulsion device 11 is in user position. In the second embodiment, the pivot block bolt 32 is set with a castle nut and cotter pin to allow pivoting at will. Bolt 49 then clamps the propeller's thrust bearing and bolt 50 secures the propeller shaft housing tube 51.

This invention may include any pivot block actuator for speed, safety, and convenience of pivoting said pivot block including but not limited to hydraulic, pneumatic, electrical solenoid, mechanical or other wireless remote controls and should be considered part of this invention.

Figure 11:
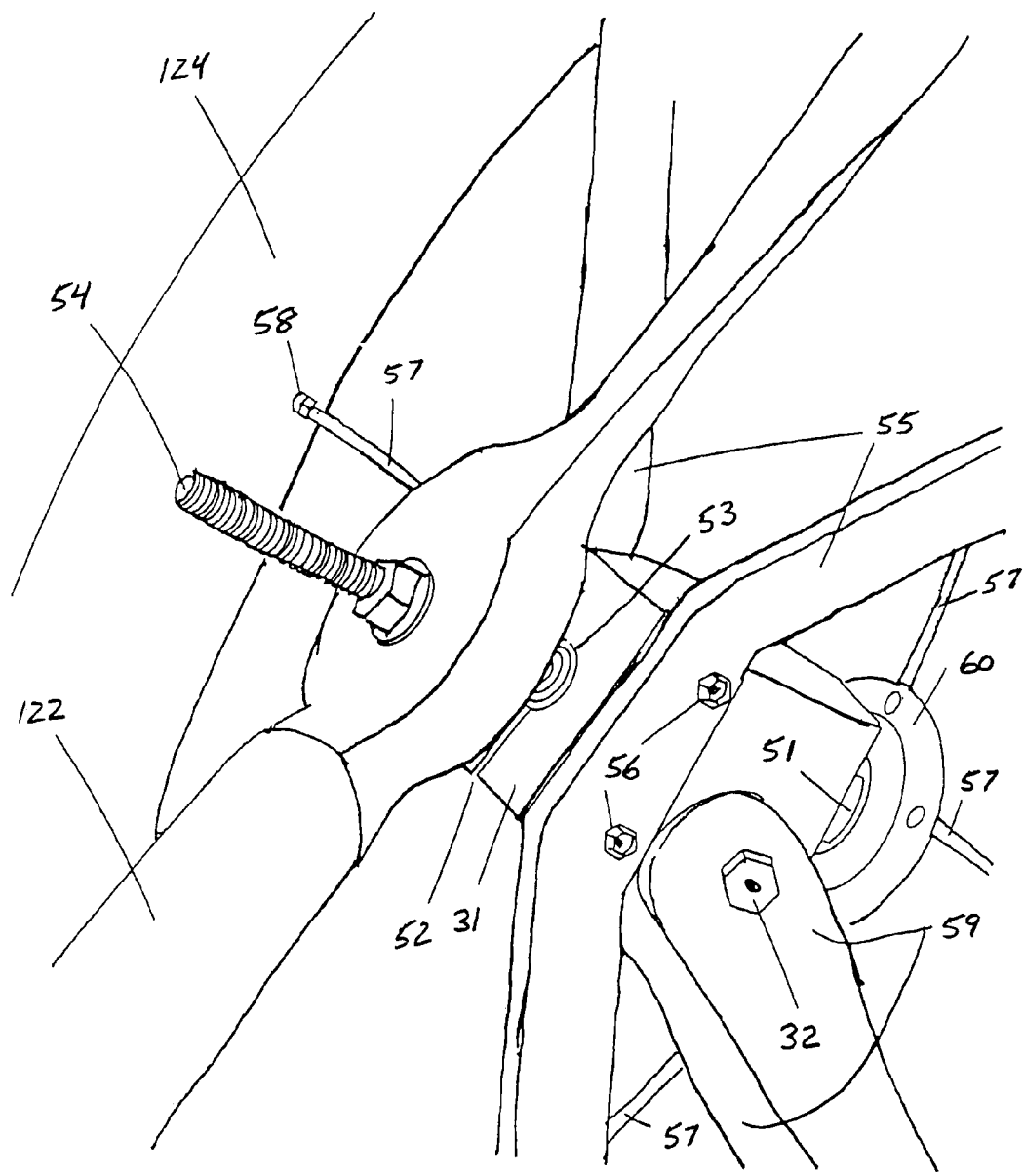
FIG. 11 is a perspective view of the rear end of the Personal Propulsion Device.

FIG. 11 is a perspective drawing viewed from the right rear of the personal propulsion device 11 and details the pivot block 31 and its various functions. When the pivot block bolt 32 is tightened it compresses slot 52 to secure propeller shaft thrust bearing 53. The propeller 122 is attached to propeller drive shaft 54 and the shaft 54 passes through the bearing 53 to the motor 29, not shown. Propeller shroud 124 is attached to pivot block 31 by support struts 55 with bolts 56. The propeller shroud 124 can be adjusted to round and set propeller 122 clearance by support spokes 57 by turning spoke nuts 58. Pivot block 31 is attached to frame ends 59 by the pivot block bolt 32. The spoke hub 60 is held in centered position by the propeller drive shaft housing tube 51 and the tube secured when bolt 32 is tightened, this clamping force also secures the motor 29, not shown, as the motor clamps to the propeller shaft housing tube 51.

The pivot block 31 allows the interchangeability of various motor sizes, powers and types, i.e. 4 stroke or 2 stroke, smaller power and lighter or larger horsepower and heavier etc. in the same string trimmer configuration. The pivot block 31 also allows quick interchangeability of the propeller shaft thrust bearing 53 in the event of bearing failure or shaft diameter variations when the motor 29 is changed. The pivot block 31 also allows interchangeability of modular shroud/strut/bumper combinations.

This modular interchangeable feature is highly desirable because people come in all sizes. For instance, a 110 lb female may enjoy a 16" diameter propeller and 1 hp engine with 10 lbs of thrust and an overall weight of 10 lbs, whereas a 250 lb man may require an 18" propeller and bumper combination and a 2.2 hp motor with 20 lbs of thrust and 17 lbs overall weight. The one pivot block 31 can be utilized to interchange frame sizes with the removal of only one pivot block bolt 32. This pivot block/motor mount/bearing mount/frame mount/strut mount is a single light weight component that attaches all modular components together. This facilitates a wide variety of option combinations for user comfort, convenience and safety.

Thus the reader will see that the personal propulsion device 11 of this invention is lightweight, quiet, economical, easy to operate, hands and arms are free and unencumbered during operation, and can be made to fit users from children to large adults. The device will save fuel and reduce emissions while providing transportation, fun and allowing users to benefit from a wide variety of HPVs.

While my above description contains many specificities, these should not be construed as limitations on the scope of the invention, but rather as an exemplification of one preferred embodiment thereof. Many other variations are possible. For example, a stretchable fabric can be affixed over the inlet end of the propeller shroud and stretched over the round bumper and attached at the back end of the propeller shroud to add color and smooth the airflow over the device. The pivot block 31 can be mounted rotatably about a vertical axis and both horizontal and vertical rotation of thrust may be controlled by D.C. step motors and remote control switches on the control glove 23. The glove 23 may be detached and retained with the user 112 after dismounting and leaving the device 11. This is a disabling feature of the propulsion unit 11 to discourage theft. Without possession of the glove 23 the thief could not start or operate the device 11.

I claim:

1. A backpack propulsion device with propulsion means imparting thrust directly to a user's back, the improvement in wherein said device has a throttle control means for hands free control of thrust magnitude and direction of thrust, said throttle control means comprising a glove configured for one or more fingers, said glove operatively connected to the device throttle, start/stop and thrust direction by wireless remote control means.

2. The device of claim 1, wherein said glove is detachable from mechanical and or electrical connections to allow interchangeability of various sizes, colors or insulation features of said glove.

3. The device of claim 2 further comprising a propeller or turbine connection means to the propulsion means by a centrifugal clutch so motion stops when engine is at idle.

4. The device of claim 3 further comprising an energy absorbing bumper disposed around a propeller shroud for a propeller, said bumper configured to improve airflow into the propeller by rounding an air inlet end of the shroud.

5. The device of claim 4, wherein the bumper is made of a stretchable material and can be inflated to increase thrust at low speeds and increase buoyancy for water craft use and safety.

6. The device of claim 4, wherein one or more lightweight panels of semi rigid material are configured and disposed in locations to cooperate with air flow around the user and into the propeller to improve thrust efficiency.

7. The device of claim 6 further comprising one or more user support straps, said user support straps being adjustable to allow the user to raise the device high on the user's back, to the middle of the user's back, or lower on the user's back.

8. The device of claim 7 further comprising a means for securing the device rotatably about a vertical axis of the user for hands free oblique thrust relative to the user.

9. The device of claim 8 further comprising a recoil rope starter handle extension means operatively attached to the propulsion means, said handle extension means having a starter pull handle is disposed on a shoulder strap just above the breast position of the user for easy grasp and pull of said pull handle in all positions of said device adjustments, both ends of the starter handle extension means being flexible and unattached to a frame of said device except in the center of the handle extension means.

10. The device of claim 9, wherein the propulsion means is pivotably attached to the frame about a horizontal axis allowing level, upward, or downward thrust substantially inline with the user's direction of travel, and in cooperation with various user positions.

11. The device of claim 10, further comprising a pivot block attached to the frame, said pivot block configured to allow interchangeability of the propulsion means.

12. The device of claim 1, wherein said propulsion device comprises a propeller shroud disposed around a propeller, said propeller shroud having a plurality of support spokes connected thereto by a spoke nut configured to allow adjustment of said propeller shroud relative to said propeller to adjust clearance therebetween.

13. The device of claim 1, wherein said throttle control means further comprises a finger end cap operatively connected to the device throttle, said finger end cap configured to be disposed on an end of a finger of the user.

14. A backpack propulsion device with propulsion means imparting thrust directly to a user's back, the improvement wherein said device has a throttle control means for hands free control of thrust magnitude and direction of thrust, said throttle control means comprising a glove configured for one or more fingers, said glove operatively connected to the device throttle, said glove detachable from mechanical and or electrical connections, said device further comprising an energy absorbing bumper disposed around a propeller shroud for a propeller, said bumper configured to improve airflow into the propeller by rounding an air inlet end of the shroud, said bumper made of a stretchable material and configured to be inflated to increase thrust at low speeds and increase buoyancy for water craft use and safety.

15. The device of claim 14 wherein said glove is operationally connected to the device throttle, start/stop, and thrust direction by wireless remote control means.

16. The device of claim 14, wherein said propulsion device comprises a propeller shroud disposed around a propeller, said propeller shroud having a plurality of support spokes connected thereto by a spoke nut configured to allow adjustment of said propeller shroud relative to said propeller to adjust clearance therebetween.

17. A backpack propulsion device with propulsion means imparting thrust directly to a user's back, the improvement wherein said device has a throttle control means for hands free control of thrust magnitude and direction of thrust, said throttle control means comprising a glove configured for one or more fingers, said glove operatively connected to the device throttle, said glove detachable from mechanical and or electrical connections, said propulsion means pivotably attached to the frame about a horizontal axis to allow level, upward or downward thrust substantially inline with the user's direction of travel, and in cooperation with various user positions.

18. The device of claim 17, wherein said propulsion device comprises a propeller shroud disposed around a propeller, said propeller shroud having a plurality of support spokes connected thereto by a spoke nut configured to allow adjustment of said propeller shroud relative to said propeller to adjust clearance therebetween.

19. The device of claim 17, further comprising a pivot block attached to the frame, said pivot block configured to allow interchangeability of the propulsion means.

20. The device of claim 17, wherein said throttle control means further comprises a finger end cap operatively connected to the device throttle, said finger end cap configured to be disposed on an end of a finger of the user.

* * * * *